(12) United States Patent
Kojima et al.

(10) Patent No.: US 12,467,883 B2
(45) Date of Patent: Nov. 11, 2025

(54) X-RAY PHASE IMAGING APPARATUS AND DISPLAY METHOD OF PREVIEW IMAGE IN X-RAY PHASE IMAGING APPARATUS

(71) Applicant: Shimadzu Corporation, Kyoto (JP)

(72) Inventors: Kana Kojima, Kyoto (JP); Yuto Maeda, Kyoto (JP); Takahiro Doki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 332 days.

(21) Appl. No.: 18/355,557

(22) Filed: Jul. 20, 2023

(65) Prior Publication Data

US 2024/0102945 A1 Mar. 28, 2024

(30) Foreign Application Priority Data

Sep. 22, 2022 (JP) .................................. 2022-151966

(51) Int. Cl.
*G01N 23/041* (2018.01)
*G01N 23/046* (2018.01)

(52) U.S. Cl.
CPC ......... *G01N 23/041* (2018.02); *G01N 23/046* (2013.01); *G01N 2223/1016* (2013.01); *G01N 2223/309* (2013.01); *G01N 2223/32* (2013.01); *G01N 2223/401* (2013.01); *G01N 2223/408* (2013.01); *G01N 2223/413* (2013.01); *G01N 2223/419* (2013.01); *G01N 2223/426* (2013.01); *G01N 2223/615* (2013.01); *G01N 2223/646* (2013.01)

(58) Field of Classification Search
None
See application file for complete search history.

(56) References Cited

U.S. PATENT DOCUMENTS

| | | | | |
|---|---|---|---|---|
| 10,267,752 | B2 * | 4/2019 | Zhang | G01N 23/041 |
| 10,506,993 | B2 * | 12/2019 | Martens | A61B 6/4042 |
| 10,598,611 | B2 * | 3/2020 | Sano | G01N 23/041 |
| 10,641,715 | B2 * | 5/2020 | Chen | G01N 23/046 |
| 10,656,103 | B2 * | 5/2020 | Sano | G01N 23/207 |
| 10,809,210 | B2 * | 10/2020 | Horiba | G01N 23/041 |
| 12,247,933 | B2 * | 3/2025 | Kojima | G01N 23/083 |
| 2015/0055743 | A1 * | 2/2015 | Vedantham | A61B 6/484 378/36 |
| 2017/0219503 | A1 * | 8/2017 | Vedantham | G01N 23/041 |
| 2017/0227476 | A1 * | 8/2017 | Zhang | G01N 23/046 |
| 2018/0153486 | A1 * | 6/2018 | Martens | A61B 6/4042 |
| 2018/0172607 | A1 * | 6/2018 | Sano | G21K 1/06 |

(Continued)

FOREIGN PATENT DOCUMENTS

JP 2021089195 A 6/2021
WO WO-2019163027 A1 * 8/2019 ............ A61B 6/06

*Primary Examiner* — Thomas R Artman
(74) *Attorney, Agent, or Firm* — Maier & Maier, PLLC

(57) ABSTRACT

An X-ray phase imaging apparatus includes an X-ray source; a detector; a plurality of gratings; a rotation mechanism; an image processor configured to generate a phase contrast image and to generate a preview image prior to capture of the phase contrast image; and a controller configured to control function of displaying on a display the preview image, and function of discriminatively displaying on the display an image coverage area for the phase contrast image that is associated with a relative rotation angle between the plurality of gratings and a subject.

10 Claims, 9 Drawing Sheets

(56) References Cited

U.S. PATENT DOCUMENTS

| | | | |
|---|---|---|---|
| 2018/0217071 A1* | 8/2018 | Chen | G01N 23/046 |
| 2019/0025232 A1* | 1/2019 | Sano | G01N 23/041 |
| 2019/0293577 A1* | 9/2019 | Horiba | G01N 23/20025 |
| 2021/0170635 A1 | 6/2021 | Ota | |
| 2024/0099682 A1* | 3/2024 | Maeda | A61B 6/463 |
| 2024/0102945 A1* | 3/2024 | Kojima | G01N 23/046 |
| 2024/0102946 A1* | 3/2024 | Kojima | G01N 23/041 |

* cited by examiner

FIG.7
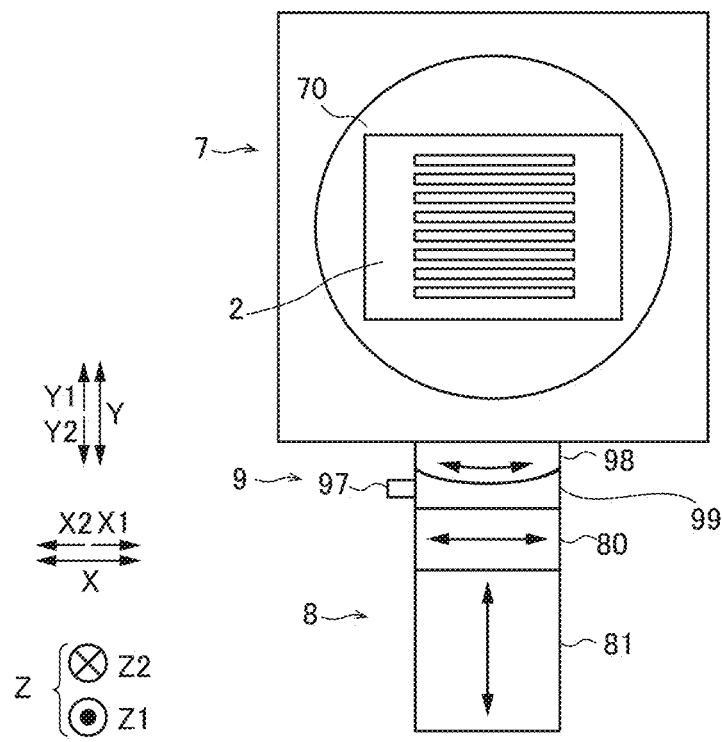
FIG.8
TRANSLATION DIRECTION OF
GRATING IN HORIZONTAL ORIENTATION
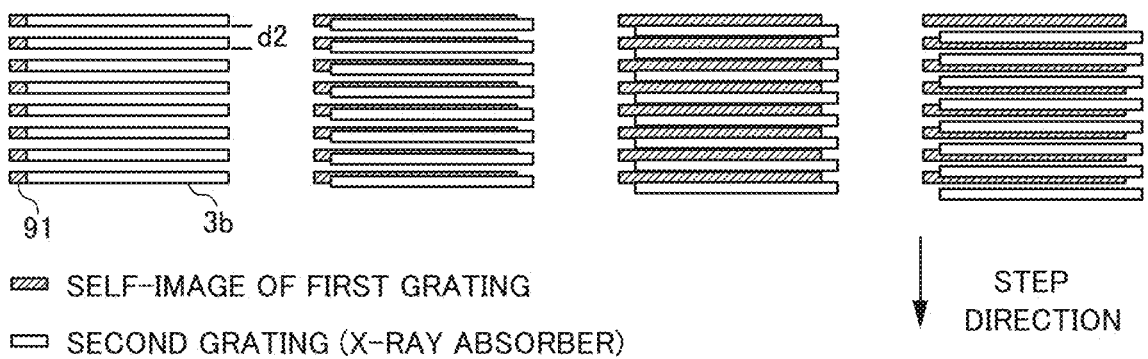
▰ SELF-IMAGE OF FIRST GRATING
▭ SECOND GRATING (X-RAY ABSORBER)
STEP DIRECTION
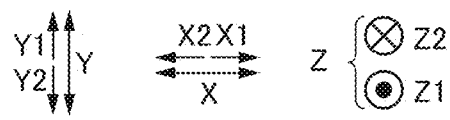

FIG.9
(A) GRATINGS ORIENTATED IN X-DIRECTION
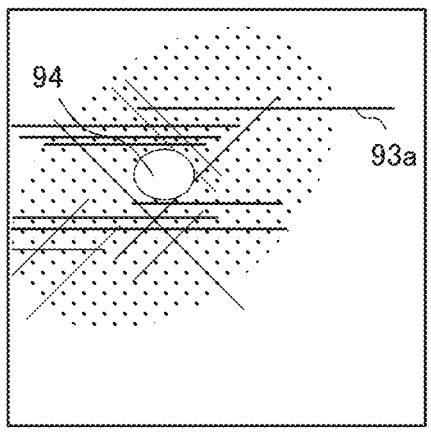
(B) GRATINGS ORIENTATED IN Y-DIRECTION
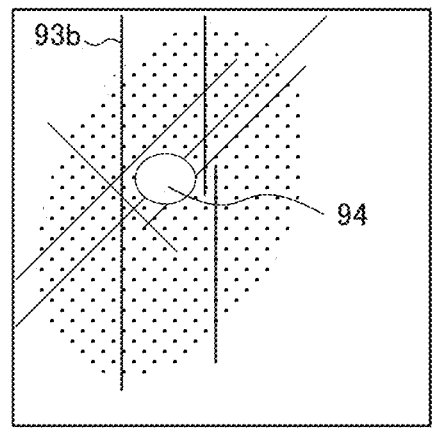
(C) COMPOSITION OF ORIENTATIONS IN X- AND Y-DIRECTIONS
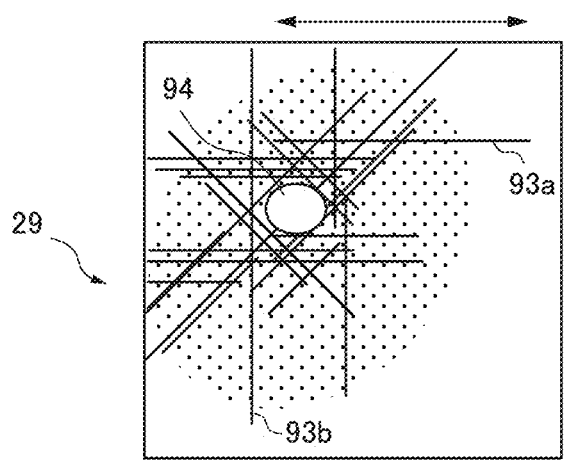

FIG.10

(A) TWO-DIMENSIONAL IMAGING MODES

| IMAGING MODE | NUMBER OF RELATIVE ROTATION ANGLES (ANGLE(S)) | IMAGE COVERAGE AREA DISPLAY CONTROL |
|---|---|---|
| IMAGING MODE A | 1 (0 DEGREE) | NO |
| IMAGING MODE B | 2 (0, 180 DEGREES) | NO |
| IMAGING MODE C | 4 (0, 45, 90, 135 DEGREES) | YES |

(B) CT IMAGING MODES

| IMAGING MODE | NUMBER OF RELATIVE ROTATION ANGLES (ANGLE(S)) | IMAGE COVERAGE AREA DISPLAY CONTROL |
|---|---|---|
| IMAGING MODE D | 1 (0 DEGREE) | NO |
| IMAGING MODE E | 2 (0, 180 DEGREES) | NO |
| IMAGING MODE F | 4 (0, 45, 90, 135 DEGREES) | YES |
| IMAGING MODE G | 8 (0, 22.5, 45, 67.5, 90, 112.5, 135, 157.5 DEGREES) | YES |

FIG.11

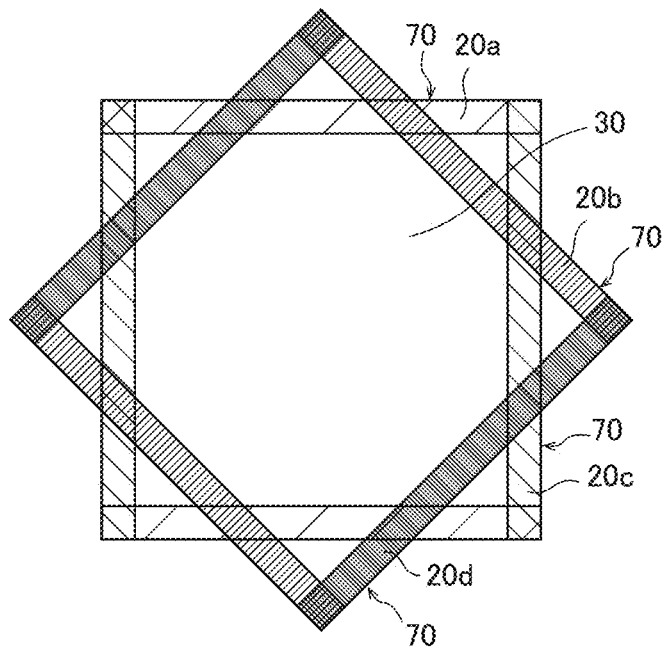

X-RAY PHASE IMAGING APPARATUS AND DISPLAY METHOD OF PREVIEW IMAGE IN X-RAY PHASE IMAGING APPARATUS

CROSS-REFERENCE TO RELATED APPLICATIONS

The related application number JP2022-151966, X-ray phase imaging apparatus and display method of preview image in X-ray phase imaging apparatus, Sep. 22, 2022, Kana Kojima, Yuto Maeda, Takahiro Doki upon which this patent application is based is hereby incorporated by reference.

FIELD

The present invention relates to an X-ray phase imaging apparatus and a display method of a preview image in an X-ray phase imaging apparatus.

BACKGROUND

Conventionally, an X-ray phase imaging apparatus including an X-ray source, a plurality of gratings and a detector is known. Such an apparatus is disclosed in Japanese Patent Laid-Open Publication No. JP 2021-89195, for example.

The above Japanese Patent Laid-Open Publication No. JP 2021-89195 discloses an X-ray imaging system (X-ray phase imaging apparatus) including an X-ray Talbot imaging device having an X-ray source, a plurality of gratings and a detector, a display, a control device (controller), and an image processing device (image processor). Also, the above Japanese Patent Laid-Open Publication No. JP 2021-89195 discloses that the image processing device generates an orientation image representing orientation of a resin and fibers from a dark-field image (phase contrast image) generated by the Talbot effect. Also, the above Japanese Patent Laid-Open Publication No. JP 2021-89195 discloses that a subject holder serving as a rotation stage is rotated about a rotation axis extending along an optical axis to vary a relative angle between each grating and a sample (subject) for orientation imaging whereby generating the orientation image.

Although not disclosed in the above Japanese Patent Laid-Open Publication No. JP 2021-89195, some of such X-ray phase imaging devices can display a preview image, which shows the subject before the phase contrast image is captured, on their display. Although not disclosed in the above Japanese Patent Laid-Open Publication No. JP 2021-89195, the preview image is an image captured under simpler imaging conditions than imaging conditions for the phase contrast image before the phase contrast image is captured. Although not disclosed in the above Japanese Patent Laid-Open Publication No. JP 2021-89195, users can check a position of the subject in the preview image displayed on the display.

Although not disclosed in the above Japanese Patent Laid-Open Publication No. JP 2021-89195, during the orientation imaging in which the relative rotation angle between the subject and the plurality of gratings is varied from zero degree to 45 degrees for example, a grating supporter may be seen along upper and lower end parts of the phase contrast image at the zero degree of the relative rotation angle. Also, the grating supporter may be seen with being orientated by 45 degrees in four corner parts of the phase contrast image at the 45 degrees of the relative rotation angle. In this case, a subject that is arranged at the position corresponding to any of the four corner parts of the preview image at the zero degree of the relative rotation angle will be included in an image coverage area at the zero degree of the relative rotation angle, but will be excluded from the image coverage area at the 45 degrees of the relative rotation angle at which the grating supporter will overlap the subject, and as a result users may fail to capture an image of the subject in the phase contrast image. Accordingly, in a case in which a phase contrast image is captured while the plurality of gratings and a subject are rotated relative to each other, it is desired to prevent such exclusion of the subject to be rotated relative to the gratings from the image coverage area.

SUMMARY

The present invention is intended to solve the above problems, and one object of the present invention is to provide an X-ray phase imaging apparatus and a display method of a preview image in an X-ray phase imaging apparatus capable of preventing exclusion of a subject to be rotated relative to a plurality of gratings from an image coverage area in a case in which a phase contrast image is captured while the plurality of gratings and the subject are rotated relative to each other.

In order to attain the aforementioned object, an X-ray phase imaging apparatus according to a first aspect of the present invention includes an X-ray source; a detector configured to detect X-rays radiated from the X-ray source; a plurality of gratings arranged between the X-ray source and the detector; a rotation mechanism configured to rotate the plurality of gratings and a subject relative to each other in a plane orthogonal to an optical axis direction of the X-rays; an image processor configured to generate a phase contrast image based on a detection signal generated by the X-ray source and the detector, and to generate a preview image based on the detection signal generated by the X-ray source and the detector prior to capture of the phase contrast image; and a controller configured to control function of displaying on a display the preview image generated by the image processor, and function of discriminatively displaying on the display an image coverage area for the phase contrast image that is associated with a relative rotation angle between the plurality of gratings and the subject.

In order to attain the aforementioned object, a display method of a preview image in an X-ray phase imaging apparatus according to a second aspect of the present invention is a display method of a preview image in an X-ray phase imaging apparatus including an X-ray source, a detector and a plurality of gratings, the method including a step of generating a preview image based on a detection signal generated by the X-ray source and the detector prior to capture of a phase contrast image; a step of displaying the preview image on a display; and a step of discriminatively displaying on the display in the preview image an image coverage area for the phase contrast image that is associated with a relative rotation angle between the plurality of gratings and a subject.

An image coverage area of a subject that is associated with a relative rotation angle is discriminatively displayed in a preview image so that users can immediately recognize the image coverage area of the subject before a phase contrast image is captured. Consequently, in a case in which a phase contrast image is captured while a plurality of gratings and the subject are rotated relative to each other, it is possible to prevent exclusion of the subject to be rotated relative to the gratings from the image coverage area.

BRIEF DESCRIPTION OF THE DRAWINGS

FIG. 7 is a schematic diagram showing an exemplary grating-moving mechanism.

FIG. 8 is an illustration illustrating translation of gratings.

FIG. 9 is a schematic diagram showing dark-field images captured at different angles and a total scattering image.

FIG. 10 is an illustrative table illustrating a plurality of imaging modes.

FIG. 11 is an illustrative schematic diagram showing overlapped phase contrasts in the two-dimensional imaging mode with a position of a subject being fixed.

DETAILED DESCRIPTION

Embodiments embodying the present invention are hereinafter described with reference to the drawings.

Overall Configuration of X-Ray Phase Imaging Apparatus

The overall configuration of an X-ray phase imaging apparatus 100 according to one embodiment is described with reference to FIG. 1.

Figure 1:
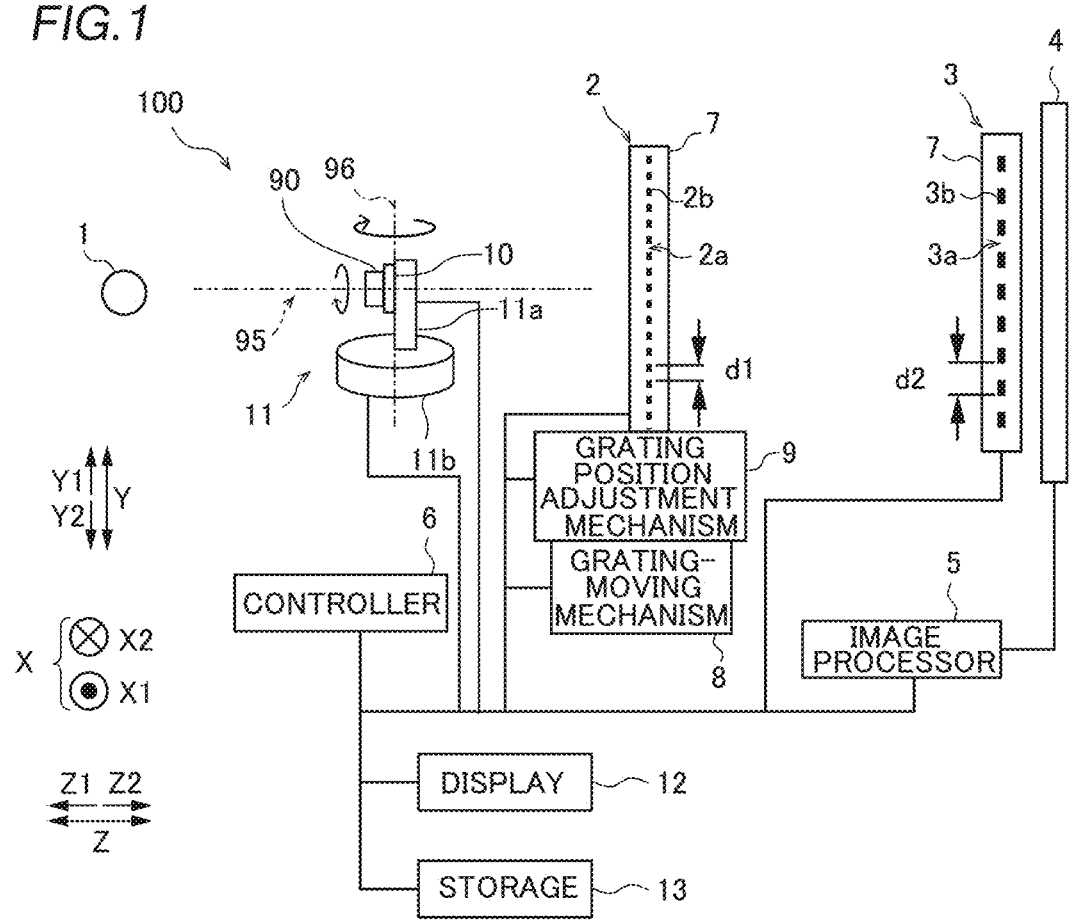
FIG. 1 is a schematic diagram showing the overall configuration of an X-ray phase imaging apparatus according to one embodiment.

As shown in FIG. 1, the X-ray phase imaging apparatus 100 is an apparatus using the Talbot effect whereby forming an image of the inside of a subject 90.

FIG. 1 is a diagram showing the X-ray phase imaging apparatus 100 as viewed in an X-direction. As shown in FIG. 1, the X-ray phase imaging apparatus 100 includes an X-ray source 1, first and second gratings 2 and 3, a detector 4, an image processor 5, a controller 6, grating rotation mechanisms 7, a grating-moving mechanism 8, a grating position adjustment mechanism 9, a subject holder 10, a rotation mechanism 11, a display 12, and a storage 13. In this specification, a direction from the X-ray source 1 to the first grating 2 is defined as a Z2 direction, while the opposite direction is defined as a Z1 direction. Also, a leftward/rightward direction in a plane orthogonal to the Z-direction is defined as an X-direction, and a direction pointing into the paper of FIG. 1 is defined as an X2 direction while a direction pointing out of the paper of FIG. 1 is defined as an X1 direction. Also, an upward/downward direction in the plane orthogonal to the Z-direction is defined as a Y-direction, and the upward and downward directions are defined as Y1 and Y2 directions. The Z-direction is an example of an "optical axis direction of (the) X-rays" in the claims. Note that positional relationship between the controller 6, the display 12 and the storage 13 is shown for the sake of convenience, and their positional relationship is not limited to the positional relationship of FIG. 1. Also, a set of the first and second gratings 2 and 3 is an example of a "plurality of gratings" in the claims.

The X-ray source 1 generates X-rays when a high voltage is applied thereto. The X-ray source 1 is configured to direct X-rays in the Z2 direction when generating the X-rays.

The first grating 2 has a plurality of slits $2a$ and a plurality of X-ray phase changers $2b$. The slits $2a$ and the X-ray phase changers $2b$ are arranged at predetermined cycles (pitches) d1 in the Y direction. Each slit $2a$ and each X-ray phase changer $2b$ linearly extend. Each slit $2a$ and each X-ray phase changer $2b$ extend in parallel to each other. The first grating 2 is a so-called phase grating.

The first grating 2 is arranged between the X-ray source 1 and the second grating 3, and is irradiated with X-rays from the X-ray source 1. The first grating 2 is provided to form a self-image 91 (see FIG. 8) of the first grating 2 by using the Talbot effect. When coherent X-rays pass through a grating in which slits are formed, a grating image (self-image 91) is formed in a position at a predetermined distance (Talbot distance) away from the grating. This is called the Talbot effect.

The second grating 3 has a plurality of X-ray transmitters $3a$ and a plurality of X-ray absorbers $3b$. The X-ray transmitters $3a$ and the X-ray absorbers $3b$ are arranged at predetermined cycles (pitches) d2 in the Y direction. Each X-ray transmitter $3a$ and each X-ray absorber $3b$ linearly extend. In addition, each X-ray transmitter $3a$ and each X-ray absorber $3b$ extend parallel to each other. The second grating 3 is a so-called absorption grating. The first and second gratings 2 and 3, which are different types of gratings serving different functions, pass X-rays through the slits $2a$ and the X-ray transmitters $3a$, respectively. The X-ray absorbers $3b$ cut off X-rays. The X-ray phase changers $2b$ change an X-ray phase in accordance with the refractive index difference between the X-ray phase changer $2b$ and the slit $2a$.

The second grating 3 is arranged between the first grating 2 and the detector 4, and is irradiated with X-rays that have passed through the first grating 2. The second grating 3 is spaced at the predetermined Talbot distance away from first grating 2. The second grating 3 is configured to interfere with the self-image 91 of the first grating 2 so as to form moire fringes on a detection surface of the detector 4.

The detector 4 is configured to detect X-rays and convert the detected X-rays into electrical signals so as to read the converted electrical signals as image signals. The detector 4 is a flat panel detector (FPD), for example. The detector 4 includes a plurality of conversion elements (not shown) and pixel electrodes (not shown) arranged on the plurality of conversion elements. The plurality of conversion elements and the pixel electrodes are aligned at predetermined cycles (pixel pitches) along the X and Y directions so as to be arranged in an array. In addition, the detector 4 is configured to provide the read image signals to the image processor 5.

The subject holder 10 is arranged between the X-ray source 1 and the detector 4, and is configured to hold the subject 90. The subject 90 can be held to the subject holder 10 through an attachment (not shown) for holding the subject 90.

Figure 2:
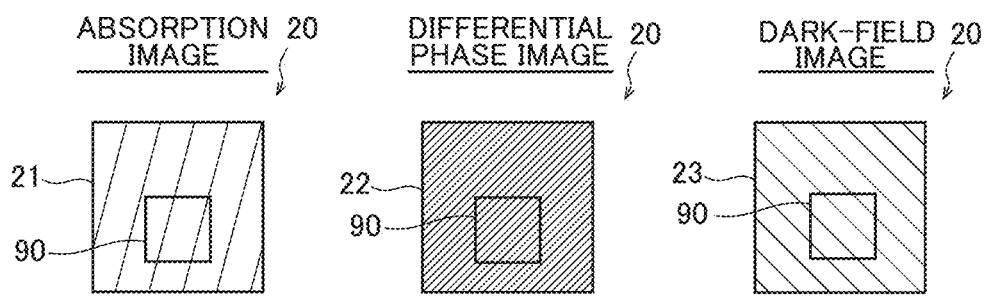
FIG. 2 is a schematic diagram showing exemplary phase contrast images.

The image processor 5 is configured to generate phase contrast images 20 (see FIG. 2) based on detection signals generated by the X-ray source 1 and the detector 4. The phase contrast images 20 include an absorption image 21 (see FIG. 2), a differential phase image 22 (see FIG. 2) and a dark-field image 23 (see FIG. 2). In this embodiment, the image processor 5 is configured to generate at least the dark-field image 23. The absorption image 21, the differential phase image 22 and the dark-field image 23 are hatched with different hatch patterns for showing that they are different types of images.

Figure 3:
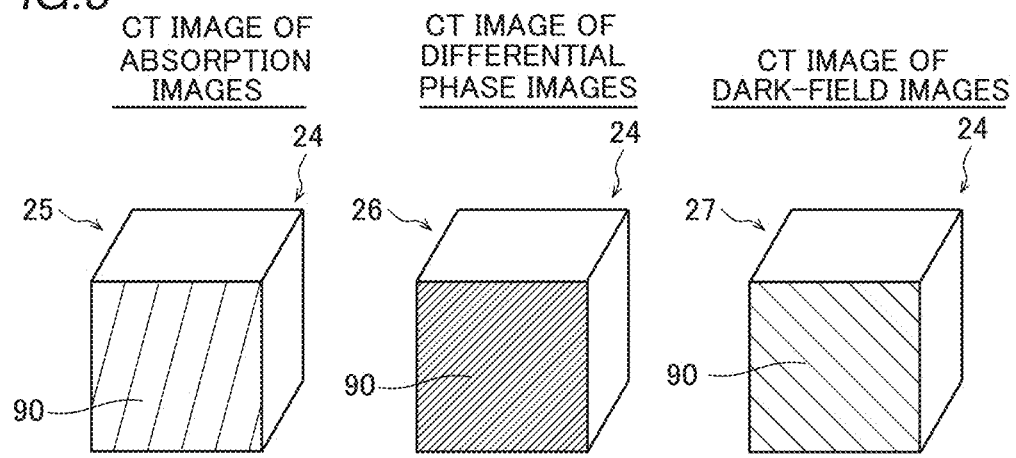
FIG. 3 is a schematic diagram showing exemplary CT images.

The image processor 5 is configured to generate three-dimensional CT (Computed Tomography) images 24 (see FIG. 3) based on a plurality of phase contrast images 20 that are generated when captured while the subject 90 is rotated relative the X-ray source 1, the detector 4 and the plurality of gratings about a second axis 96. The three-dimensional CT images 24 include a CT image 25 of the absorption images (see FIG. 3), a CT image 26 of the differential phase images (see FIG. 3) and a CT image 27 of the dark-field images (see FIG. 3). In this embodiment, the image processor 5 is configured to generate at least the CT image 27 of the dark-field images. The CT image 25 of the absorption images, the CT image 26 of the differential phase images and the CT image 27 of the dark-field images are hatched with different hatch patterns for showing that they are different types of images.

The dark-field image is a visibility image subjected to phase processing based on a change in visibility in accordance with on small-angle scattering of an object. The dark-field image is also called a small-angle scattering image. The "visibility" denotes sharpness of the self-image 91. The absorption image is an image subjected to phase processing based on attenuation of X-rays that are attenuated when the X-rays pass through the subject 90. The differential phase image is an image subjected to phase processing based on a phase shift of X-rays when the X-rays pass through the subject 90.

The image processor 5 is configured to generate a preview image 28 (see FIG. 4) based on detection signals generated by the X-ray source 1 and the detector 4 before the phase contrast image 20 is captured. The preview image 28 (see FIG. 4) is an image captured under simpler imaging conditions (e.g., shorter exposure time, or lower tube voltage or X-ray tube current) than imaging conditions for the phase contrast image 20 before the phase contrast image 20 is captured. For more information, the preview image 28 is a moving image that is obtained by updating the latest one of X-ray images of the subject 90 irradiated with X-rays from the X-ray source 1 that are sequentially captured, and is also referred to as a fluoroscopic image. The preview image 28 (see FIG. 4) may be a still image corresponding to one of the time-lapse X-ray images of the subject 90 irradiated with X-rays from the X-ray source 1. Here, the preview image 28 (see FIG. 4) is an image that is not subjected to phase processing by the image processor 5 and includes moire fringes (not shown).

The image processor 5 includes a processor, such as a graphics processing unit (GPU) or a field-programmable gate array (FPGA) configured for image processing, for example.

The controller 6 is configured to rotate the gratings by using the grating rotation mechanisms 7 so as to vary an angle (grating rotation angle) between each grating and the subject 90. In addition, the controller 6 is configured to move the first grating 2 in a vertical direction (Y-direction) or a lateral direction (X-direction) in a grating plane by using the grating-moving mechanism 8. In addition, the controller 6 is configured to rotate the subject 90 about a first axis 95 and the second axis 96 by using the rotation mechanism 11 so as to rotate the subject 90 relative to the X-ray source 1, the detector 4 and the plurality of gratings.

In addition, the controller 6 is configured to display the preview image 28, which is generated by the image processor 5, on the display 12. In addition, the controller 6 is configured to control function of discriminatively displaying an image coverage area 30 (see FIG. 5) of the phase contrast image 20, which is associated with a relative rotation angle between the plurality of gratings and the subject 90 (the subject holder 10), in the preview image 28 on the display 12. The function of discriminatively displaying the image coverage area 30 in the preview image 28 controlled by the controller 6 will be described later. For example, the controller 6 includes a processor such as CPU (Central Processing Unit).

The grating rotation mechanisms 7 are configured to rotate the first and second gratings 2 and 3 in a plane orthogonal to the optical axis direction of X-rays based on a signal from the controller 6. Each of the first and second gratings 2 and 3 are provided with its corresponding grating rotation mechanism 7. Each grating rotation mechanism 7 includes a grating supporter 70 configured to hold its corresponding grating, and a rotator 71 configured to rotate the grating supporter 70. The grating supporter 70 supports its corresponding one of the plurality of gratings, and is rotated together with the corresponding grating relative to the subject. The grating rotation mechanism 7 is configured to rotate the corresponding grating so as to vary an angle between each grating and the subject 90. The grating rotation mechanism 7 is an example of a "rotation mechanism" in the claims. The configuration of the grating rotation mechanism 7 for rotating the grating will be described in detail later.

The grating-moving mechanism 8 is configured to move the first grating 2 in the vertical direction (Y-direction) or the lateral direction (X-direction) based on a signal from the controller 6. The vertical direction is defined by a direction corresponding to approximately 90 degrees of an orientation of the grating with reference to the horizontal direction (X-direction) orthogonal to the optical axis direction of X-rays (Z-direction). The lateral direction is defined by a direction corresponding to approximately zero degrees of an orientation of the grating with reference to the horizontal direction (X-direction) orthogonal to the optical axis direction of X-rays (Z-direction). The configuration of the grating-moving mechanism 8 for moving the grating will be described in detail later. In addition, the grating-moving mechanism 8 is configured to hold the grating rotation mechanism 7 through the grating position adjustment mechanism 9.

The grating position adjustment mechanism 9 is configured to move the first grating 2 whereby adjusting a relative position between the plurality of gratings based on a signal from the controller 6. The configuration of the grating position adjustment mechanism 9 for adjusting the relative position between the plurality of gratings will be described in detail later.

The rotation mechanism 11 is configured to rotate the subject 90 (subject holder 10) relative to the X-ray source 1, the detector 4 and the plurality of gratings based on a signal from the controller 6. The rotation mechanism 11 includes first and second rotation mechanisms 11a and 11b. The first rotation mechanism 11a includes the subject holder 10 configured to hold the subject 90, and is configured to rotate the subject holder 10 in a first rotating direction about the first axis 95, which becomes collinear with an X-ray irradiation axis when the first rotation mechanism 11a faces the X-ray source 1 and passes through a center of the subject holder 10. The second rotation mechanism 11b holds the first rotation mechanism 11a, and is configured to rotate the first rotation mechanism 11a in a second rotating direction about the second axis 96 extending orthogonal to the first axis 95. The rotation mechanism 11 includes electric motors, etc. The first rotation mechanism 11a is an example of the "rotation mechanism" in the claims.

The storage 13 is configured to store a program to be executed by the controller 6, two-dimensional phase contrast and CT images 20 and 24 generated by the image processor 5, a plurality of imaging modes A to G, and different image coverage areas 30 corresponding to the plurality of imaging modes for the phase contrast images 20 that are associated with the relative rotation angles between the plurality of gratings and the subject 90. The image coverage areas 30 have been obtained for phase contrast images to be captured in the relative rotation, and are stored in the storage 13. The storage 13 includes a hard disk drive (HDD) or a nonvolatile memory, for example. In this specification, the relative rotation angles refer to angles between the first and second gratings 2 and 3, and the subject 90 in the plane orthogonal to the optical axis direction of X-rays. The relative rotation angles include grating and subject rotation angles. The grating rotation angle refers to an angle between each grating and the subject 90 when the first and second gratings 2 and 3 are rotated by the grating rotation mechanisms 7 in two-dimensional imaging modes described later. The subject rotation angle refers to an angle between the subject 90 and each grating when the subject holder 10 is rotated by the first rotation mechanism 11a in CT imaging modes.

The preview image 28 is displayed on the display 12 by the controller 6. The display 12 includes an LCD monitor, for example.

Grating Rotation, Grating-Moving and Grating Position Adjustment Mechanisms

The configurations of the grating rotation mechanism 7, the grating-moving mechanism 8 and the grating position adjustment mechanism 9 are described with reference to FIGS. 6 and 7.

Figure 6:
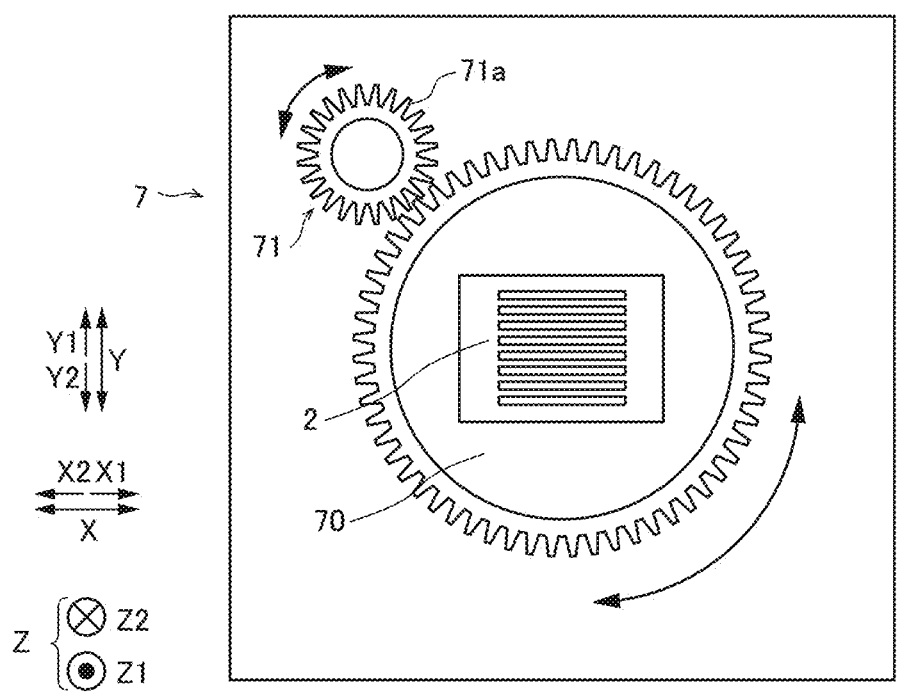
FIG. 6 is a schematic diagram showing an exemplary grating rotation mechanism.

As shown in FIG. 6, the grating rotation mechanism 7 includes the grating supporter 70 configured to hold its corresponding grating, and the rotator 71 configured to rotate the grating supporter 70. The grating supporter 70 is configured to hold its corresponding one of the first and second gratings 2 and 3 on its interior side in contact with the first or second grating 2 or 3. The grating supporter 70 has a disk shape. In addition, teeth are formed on the outer peripheral surface of the grating supporter 70.

The rotator 71 includes a driver (not shown) and a rotating part 71a. The driver includes an electric motor, an encoder, etc. The rotating part 71a has a disk shape. In addition, teeth are formed on the outer peripheral surface of the rotating part 71a. The rotating part 71a is configured to be rotated by the driver. Although FIG. 6 illustrates the grating rotation mechanism 7 that is configured to rotate the first grating 2, the grating rotation mechanism 7 that is configured to rotate the second grating 3 has the similar stricture to the grating rotation mechanism 7 that is configured to rotate the first grating 2.

As shown in FIG. 7, the grating-moving mechanism 8 is configured to move the grating in the vertical direction (Y-direction) or the lateral direction (X-direction) in a plane (XY plane) that is orthogonal to the optical axis direction (Z-direction). Specifically, as shown in FIG. 7, the grating-moving mechanism 8 includes X-directional and Y-directional translation mechanisms 80 and 81. The X-directional translation mechanism 80 is configured to be able to translationally move in the X-direction. For example, the X-directional translation mechanism 80 includes a stepping motors, etc. The Y-directional translation mechanism 81 is configured to be able to translationally move in the Y-direction. For example, the Y-directional translation mechanism 81 includes a stepping motors, etc. The grating-moving mechanism 8 is configured to translate the grating rotation mechanism 7 in the X-direction through the grating position adjustment mechanism 9 by using movement of the X-directional translation mechanism 80. Also, the grating-moving mechanism 8 is configured to translate the grating rotation mechanism 7 in the Y-direction through the grating position adjustment mechanism 9 by using movement of the Y-directional translation mechanism 81. In other words, the grating-moving mechanism 8 is configured to move the first grating 2 together with the grating rotation mechanism 7.

As shown in FIG. 7, the grating position adjustment mechanism 9 is arranged on the grating-moving mechanism 8. The grating position adjustment mechanism 9 includes a stage supporter 99, a driver 97 and a stage 98. The stage supporter 99 supports the stage 98 from its lower side (in the Y1 direction). The driver 97 is configured to move the stage supporter 99 back and forth in the X-direction. The stage 98 has a convex bottom shape bulging toward the stage supporter 99, and is configured to rotate about its center axis extending in the Z-direction when moving back and forth in the X-direction. Dissimilar to the grating rotation mechanism 7, which is configured to vary orientation of its corresponding grating by rotating the grating in a large range, the grating position adjustment mechanism 9 is configured to finely adjust an angle of the grating in the XY plane.

(Translation of Grating)

Control by the controller 6 that translates the grating by using the grating-moving mechanism 8 is described with reference to FIG. 8. In this embodiment, image processor 5 generates the phase contrast images 20 by fringe scanning. The fringe scanning is a technique that generates an image based on a detection signal curve (step curve) of X-rays detected when a plurality of images are captured while one of the gratings is translated not smaller than one cycle of another grating. In this embodiment, the grating-moving mechanism 8 is configured to translate the first grating 2 by not smaller than one cycle (d2) of the second grating 3. FIG. 6 is a schematic diagram showing translation of the grating, which is aligned in an exemplary lateral orientation (extends in the X-direction). In the case in which the grating is aligned in the lateral orientation (extends in the X-direction), the controller 6 will translate the first grating 2 in the Y2 direction by using the grating position adjustment mechanism 9.

(Generation and Composition of Dark-Field Images, and Generation of Vector Direction Color Map)

Generation and composition of a plurality of dark-field images 23, and generation of a vector direction color map is described with reference to FIG. 9.

The image processor 5 is configured to generate a plurality of dark-field images 23 that are captured when the gratings are rotated to different angles by the grating rotation mechanisms 7 in the plane orthogonal to the optical axis direction of X-rays in a case in which the phase contrast image 20 corresponding to the dark-field images 23 is generated. The different angles include a grating rotation angle (relative rotation angle) of the gratings, and a grating rotation angle(s) corresponding to a predetermined angle(s) to which the first and second gratings 2 and 3 are rotated by the grating rotation mechanisms 7. The predetermined angle is 90 degrees, for example. Note that the number of such predetermined angles and the number of the dark-field images 23 that are captured at the different angles are not specifically limited.

Also, the image processor 5 is configured to combine the plurality of dark-field images 23, which are captured when the gratings are orientated at different angles in the plane orthogonal to the optical axis direction, and to produce a total scattering image 29 representing scattering intensities of X-rays that are scattered by the subject 90. The total scattering image 29 is an image corresponding to the total scattering intensities that are acquired in images captured at different orientations in which the grating angle is changed.

The controller 6 is configured to rotate the first and second gratings 2 and 3 to a relative rotation angle zero degree (to orientate the first and second gratings 2 and 3 in the X-direction) by using the grating rotation mechanisms 7. The controller 6 is configured to capture images of the subject 90 while translating the first grating 2 by using the grating-moving mechanism 8. The image processor 5 is configured to generate the dark-field images 23 of the subject 90.

FIG. 9(A) shows a dark-field image 23 that is captured when the gratings are orientated at a relative rotation angle zero degree (in the X-direction). In the exemplary image shown in FIG. 9(A), because the gratings are orientated at a relative rotation angle zero degree (in the X-direction), among scratches 93 included in the subject 90, scratches 93*a* that extend in the X-direction will be clearly shown. Here, a circular area 94 displays a blow mark that has been produced when the subject 90 is struck a blow.

Subsequently, the controller 6 will rotate the first and second gratings 2 and 3 by a predetermined angle by using the grating rotation mechanisms 7 so that the first and second gratings 2 and 3 are orientated at a relative rotation angle 90 degrees (in the Y-direction). The controller 6 will capture images of the subject 90 while translating the first grating 2 by using the grating-moving mechanism 8. The image processor 5 will generate the dark-field images 23 of the subject 90.

FIG. 9(B) shows a dark-field image 23 that is captured when the gratings are orientated at a relative rotation angle of 90 degrees (in the Y-direction). In the exemplary image shown in FIG. 9(B), because the gratings are orientated at a relative rotation angle 90 degrees (in the Y-direction), among the scratches 93 included in the subject 90, scratches 93*b* that extend in the Y-direction will be clearly shown. Also, the circular area 94 displays a blow mark that has been produced when the subject 90 is struck a blow.

Subsequently, the image processor 5 will combine the dark-field images 23 that have been captured when the gratings are orientated in the X- and the Y-directions so as to produce the total scattering image 29. Known techniques can be used for the composition, and the composition technique for combining the dark-field images is not specifically limited.

FIG. 9(C) shows the total scattering image 29, which is produced by combining the dark-field images 23 that have been captured when the gratings are orientated in the X- and Y-directions. In the exemplary image shown in FIG. 9(C), an oval area 16 shows an area in which X-rays scattered in the Y- and X-directions by delamination in the subject 90 are detected.

Subsequently, the image processor 5 will generate the vector direction color map image (not shown) based on the total scattering image 29. The vector direction color map image is an image representing orientations of resin and fibers included in the subject 90 by colors, for example. The vector direction color map image can represent orientation degrees and directions of resin and fibers included in the subject 90 pixel by pixel. Also, the vector direction color map image can represent amounts and directions of resin and fibers included in the subject 90 pixel by pixel. Known techniques can be used for the generation of the vector direction color map image, and the generation technique is not specifically limited.

(Imaging Mode)

The plurality of imaging modes A to G are described with reference to FIG. 10. In the present embodiment, the plurality of imaging modes A to G includes the two-dimensional imaging modes that generate their corresponding one or more two-dimensional phase contrast image 20, and the CT imaging modes that generate two-dimensional phase contrast images 20 and their corresponding three-dimensional CT image 24 based on the phase contrast images 20 generated. At least a dark-field image 23 is included as the two-dimensional phase contrast image 20. At least a CT image 27 of dark-field images is included as the three-dimensional CT image. Users can select one of the plurality of imaging modes A to G prior to capture of a phase contrast image 20.

The two-dimensional imaging modes include imaging modes A, B and C. In the imaging mode A, an image of the subject 90 is captured at one relative rotation angle as the relative rotation angle (grating rotation angle) between the plurality of gratings and the subject 90 (subject holder 10). An exemplary relative rotation angle in the imaging mode A is zero degree. In the imaging mode B, images of the subject 90 are captured at two relative rotation angles as the relative rotation angle (grating rotation angle) between the plurality of gratings and the subject 90. Exemplary relative rotation angles in the imaging mode B are zero and 180 degrees. In the imaging mode C, images of the subject 90 are captured at four relative rotation angles as the relative rotation angle (grating rotation angle) between the plurality of gratings and the subject 90. Exemplary relative rotation angles in the imaging mode C are zero, 45, 90 and 135 degrees. The imaging mode C is an example of a "first imaging mode" in the claims. In a case in which dark-field images 23 are generated in the imaging mode C, the image processor 5 can generate a vector direction color map image based on the dark-field images 23.

The controller 6 is configured to rotate the first and second gratings 2 and 3 by using the grating rotation mechanisms 7 whereby varying an angle between each grating and the subject 90 in the plane orthogonal to the optical axis direction of X-rays in the two-dimensional imaging modes.

The CT imaging modes include imaging modes D, E, F and G. In the imaging mode D, an image of the subject 90 is captured at one relative rotation angle as the relative rotation angle (subject rotation angle) between the plurality of gratings and the subject 90 (subject holder 10). An exemplary relative rotation angle in the imaging mode D is zero degree. In the imaging mode E, images of the subject 90 are captured at two relative rotation angles as the relative rotation angle (subject rotation angle) between the plurality of gratings and the subject 90. Exemplary relative rotation angles in the imaging mode E are zero and 180 degrees. In the imaging mode F, images of the subject 90 are captured at four relative rotation angles as the relative rotation angle (subject rotation angle) between the plurality of gratings and the subject 90. Exemplary relative rotation angles in the imaging mode F are zero, 45, 90 and 135 degrees. In the imaging mode G, images of the subject 90 are captured at eight relative rotation angles as the relative rotation angle (subject rotation angle) between the plurality of gratings and the subject 90. Exemplary relative rotation angles in the imaging mode G are zero, 22.5, 45, 67.5, 90, 112.5, 135 and 157.5 degrees. The imaging modes F and G are examples of a "second imaging mode" in the claims. In a case in which a CT image 27 of dark-field images is generated in the imaging modes F and G, the image processor 5 can generate a vector direction color map image based on a plurality of dark-field images 23.

The controller 6 is configured to rotate the subject holder 10 by using the first rotation mechanism 11a whereby varying an angle between the subject 90 and each grating in the plane orthogonal to the optical axis direction of X-rays in the CT imaging modes.

Function of Discriminatively Displaying Image Coverage Area by Controller

The function of discriminatively displaying the image coverage area 30 controlled by the controller 6 is described with reference to FIGS. 4, 5, and 11 to 13. The function of discriminatively displaying the image coverage area 30 controlled by the controller 6 is executed in the imaging mode C among the two-dimensional image imaging modes, and the imaging modes F and G among the CT image imaging modes. The controller 6 is configured to control the function of discriminatively displaying the image coverage area 30 in accordance with the imaging mode that has been selected by a user.

The controller 6 is configured to control function of superimposing on the preview image 28 a mark 32 representing an image coverage area 30 that is associated with the relative rotation angles between the plurality of gratings and the subject 90 (subject holder 10) as the function of discriminatively displaying the image coverage area 30.

Control in Imaging Mode C among Two-Dimensional Imaging Modes

Figure 4:
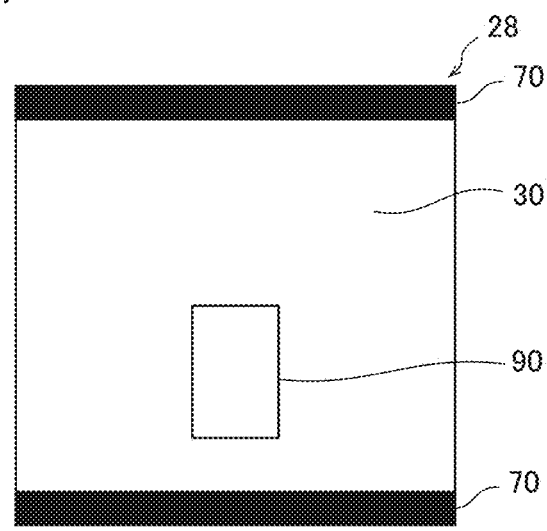
FIG. 4 is a schematic diagram showing an exemplary preview image without its image coverage area being displayed.

FIG. 4 is a schematic diagram illustrating a preview image 28 at a relative rotation angle (grating rotation angle) zero degree in the imaging mode C. In the preview image 28 at a relative rotation angle zero degree, the grating supporter 70 is seen in the preview image 28 along the top and bottom edges of the preview image 28. Because of the relation between grating size and angle of view, the preview image 28 includes the grating supporter 70. The image coverage area 30 is an area that does not overlap the positions corresponding to the grating supporter 70. In the imaging mode C, images of the subject 90 are captured at relative rotation angles between the subject 90 and the plurality of gratings of zero, 45, 90 and 135 degrees.

FIG. 11 is an illustrative schematic diagram showing a phase contrast image 20a at a relative rotation angle zero degree, and phase contrast images 20b, 20c and 20d at relative rotation angles 45, 90 and 135 degrees, respectively, which are superimposed on the phase contrast image 20a, with the position of the subject 90 being fixed for ease of illustration. The subject 90 is not shown for ease of illustration. In addition, the grating supporters 70 are shown by different hatch patterns corresponding to these different phase contrast images for ease of illustration. Depending on relative rotation angles between the plurality of gratings and the subject 90, positions corresponding to each grating supporter 70 in the phase contrast images that are captured at the four relative rotation angles relative to the subject can be different from each other. In other words, depending on the phase contrast images their corresponding image coverage areas 30 can be different from each other.

The storage 13 (see FIG. 1) previously stores the image coverage areas 30 corresponding to phase contrast images 20 that are associated with relative rotation angles (grating rotation angles) between the plurality of gratings and the subject 90 (subject holder 10). Positions corresponding to the grating supporter 70 that will be seen in their corresponding phase contrast images 20 at a plurality of relative rotation angles are previously computed with reference to a position of the grating supporter 70 at a relative rotation angle zero degree that will be seen in the preview image 28, and are stored as a plurality of image coverage areas 30 in the storage 13. The storage 13 stores the plurality of image coverage areas 30, which are associated with relative rotation angles between the plurality of gratings and the subject 90. The storage 13 stores four image coverage areas 30 of the imaging mode C.

The controller 6 (see FIG. 1) is configured to specify a predetermined area as the image coverage area 30 in the imaging mode C based on positions that correspond to the grating supporters 70 and will be seen in the preview images 28 at the four relative rotation angles (grating rotation angles). Also, the controller 6 is configured to specify as the image coverage area 30 in the imaging mode C an overlap area that is included in a plurality of image coverage areas 30 corresponding to a plurality of relative rotation angles.

Figure 5:
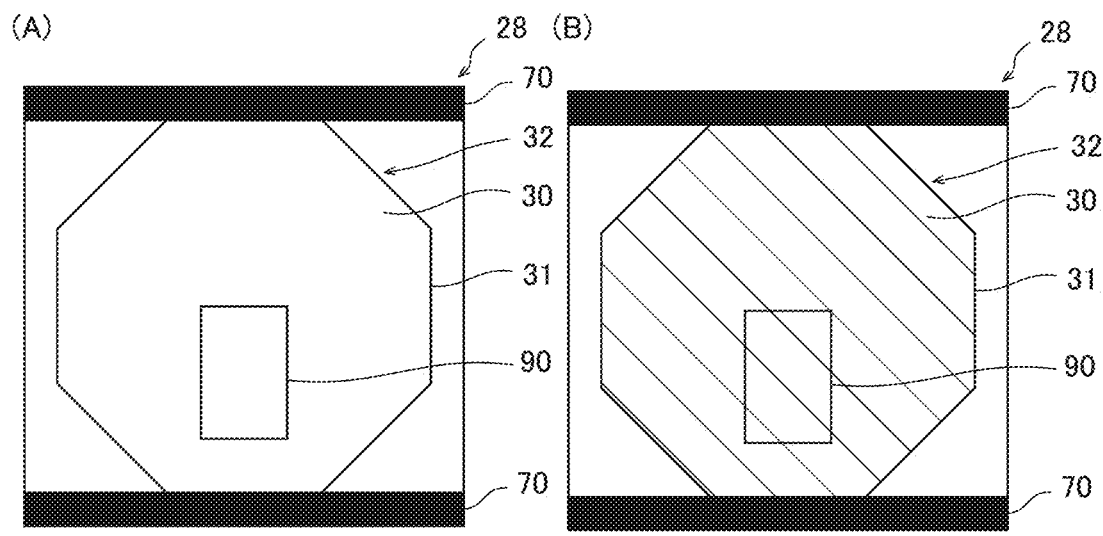
FIG. 5 is a schematic diagram showing exemplary preview images in a two-dimensional imaging mode with their image coverage area being displayed.

FIG. 5 is a schematic diagram illustrating the preview images 28 in the imaging mode C under control by the controller 6 that discriminatively displays the image coverage area 30. Specifically, as shown in FIG. 5(A), the controller 6 is configured to control function of displaying a line 31 representing the image coverage area 30 as the function of discriminatively displaying the image coverage area 30. The image coverage area 30 in the imaging mode C has an octagonal shape. The controller 6 can display an octagonal framed image as the image coverage area 30 in the preview image 28. FIG. 5(B) is a diagram illustrating the image coverage area 30 with a hatch pattern in the preview image 28 for ease of illustration.

When the imaging mode C is selected by a user, the controller 6 will display an octagonal framed image in accordance with the image coverage area 30 stored in the storage 13 in the preview image 28.

Control in Imaging Modes F and G among CT Imaging Modes

The image coverage areas 30 for phase contrast images 20, which are associated with relative rotation angles between the plurality of gratings and the subject holder 10, under control in the imaging modes F and G among the CT imaging modes are different from the imaging mode C among the two-dimensional image imaging modes. The following description describes this difference, and control similar to the control in the imaging mode C among the two-dimensional image imaging modes is omitted.

Figure 12:
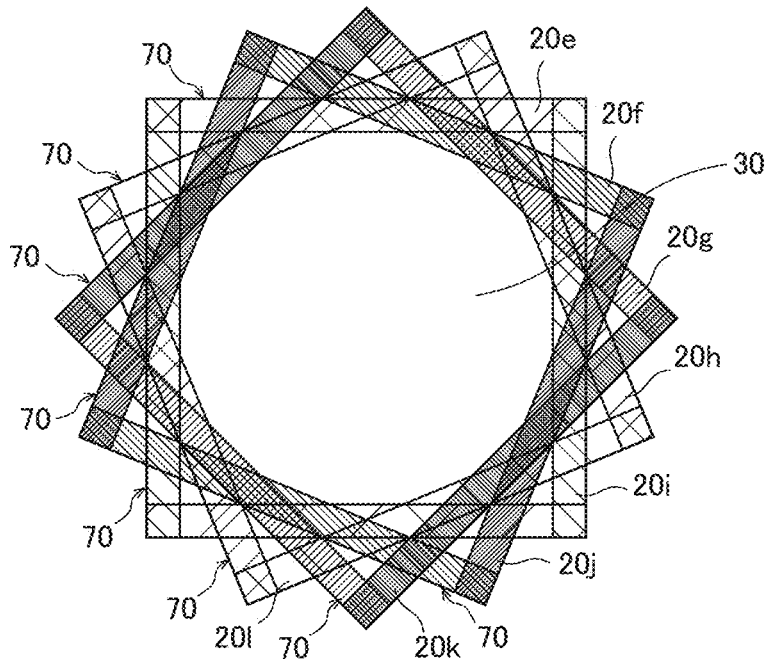
FIG. 12 is an illustrative schematic diagram showing overlapped phase contrasts in a CT imaging mode with a position of a subject being fixed.

The image coverage area 30 for the phase contrast image 20 in the imaging mode G among the CT image imaging modes is now described. FIG. 12 is an illustrative schematic diagram showing a phase contrast image 20e at a relative rotation angle (subject rotation angle) zero degree, and phase contrast images 20f, 20g, 20h, 20i, 20j, 20k and 20l at relative rotation angles 22.5, 45, 67.5, 90, 112.5, 135, and 157.5 degrees, respectively, which are superimposed on the phase contrast image 20e, with the position of the subject 90 being fixed for ease of illustration. The subject 90 is not shown for ease of illustration. In addition, the grating supporters 70 are shown by different hatch patterns corresponding to these different phase contrast images for ease of illustration. Depending on relative rotation angles between the plurality of gratings and the subject 90, positions corresponding to each grating supporter 70 in the phase contrast images that are captured at the eight relative rotation angles relative to the subject can be different from each other. In other words, depending on the phase contrast images their corresponding image coverage areas 30 can be different from each other.

The storage 13 (see FIG. 1) previously stores the image coverage areas 30 corresponding to phase contrast images 20 that are associated with relative rotation angles (subject rotation angles) between the plurality of gratings and the subject 90. The storage 13 stores four image coverage areas 30 of the imaging mode F and eight image coverage areas 30 of the imaging mode G.

The controller 6 is configured to specify a predetermined area as the image coverage area 30 in the imaging mode G based on positions that correspond to the grating supporters 70 and will be seen in the preview images 28 at the eight relative rotation angles (subject rotation angles). Also, the controller 6 is configured to specify as the image coverage areas 30 in the imaging mode G an area based on an overlap area that is included in a plurality of image coverage areas 30 corresponding to a plurality of relative rotation angles.

Figure 13:
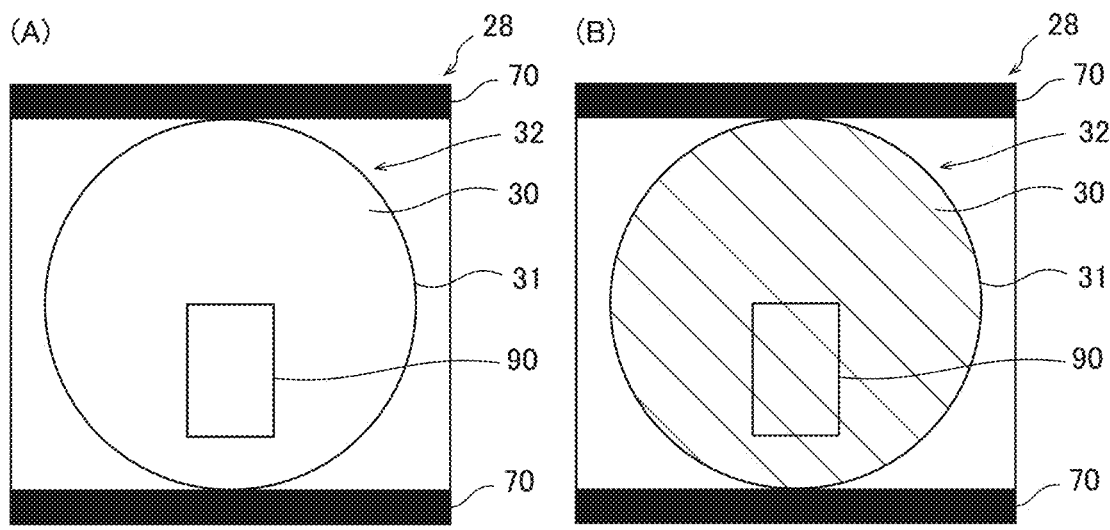
FIG. 13 is a schematic diagram showing exemplary preview images in the CT imaging mode with their image coverage area being displayed.

FIG. 13 is a schematic diagram illustrating the preview images 28 in the imaging mode G under control by the controller 6 that discriminatively displays the image coverage area 30. Specifically, as shown in FIG. 13, the controller 6 is configured to control function of displaying a line 31 representing the image coverage area 30 as the function of discriminatively displaying the image coverage area 30. The overlap area in the imaging mode G, which is included in a plurality of image coverage areas 30 corresponding to a plurality of relative rotation angles, has a hexadecagonal (sixteen-sided polygonal) shape. However, in order to improve legibility of the image coverage area 30 relative to such a hexadecagonal shape, a circular shape inscribed in the hexadecagonal shape is displayed as the overlap area, which is included in a plurality of image coverage areas 30 corresponding to a plurality of relative rotation angles, as the image coverage area 30 in capture of the phase contrast images 20. The controller can display a circular frame line as the image coverage area 30 in the preview image 28. FIG. 13 is a diagram illustrating the image coverage area 30 with a hatch pattern in the preview image 28 for ease of illustration.

The overlap area in the imaging mode F, which is included in a plurality of image coverage areas 30 corresponding to a plurality of relative rotation angles, has an octagonal shape. However, a circular shape inscribed in the octagonal shape is displayed as the overlap area, which is included in a plurality of image coverage areas 30 corresponding to a plurality of relative rotation angles, as the image coverage area 30 in capture of the phase contrast images 20 similar to the imaging mode G.

When the imaging mode F or G is selected by a user, the controller 6 will display a circular framed image in accordance with the image coverage area 30 stored in the storage 13 in the preview image 28.

In the imaging mode A among the two-dimensional image imaging modes and the imaging mode D among the CT image imaging modes, because an image is captured at one relative rotation angle relative to the subject 90, their image coverage area 30 is unchanged. Also, in the imaging mode B among the two-dimensional image imaging modes and the imaging mode E among the CT image imaging modes, because a plurality of phase contrast images 20 are captured with being turned upside down relative to each other, their image coverage areas 30 are not different from each other depending on the plurality of phase contrast images. For this reason, in this embodiment the function of discriminatively displaying the image coverage area 30 controlled by the controller 6 is not executed in the imaging mode A among the two-dimensional image imaging modes and the imaging mode D among the CT image imaging modes.

Display Control Processing for Image Coverage Area

Figure 14:
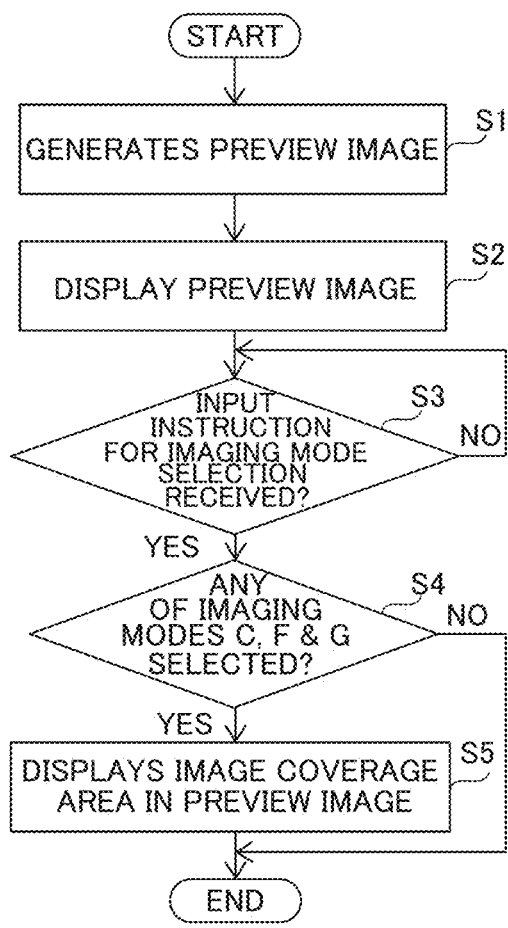
FIG. 14 is a flowchart illustrating display control processing for an image coverage area.

Display control processing for the image coverage area 30 according to this embodiment is described with reference to FIG. 14.

In step S1, the image processor 5 generates a preview image 28 based on detection signals generated by the X-ray source 1 and the detector 4 before a phase contrast image 20 is captured. Subsequently, the procedure goes to step S2.

In step S2, the controller 6 displays the preview image 28, which is generated by the image processor 5, on the display 12. Subsequently, the procedure goes to step S3.

In step S3, the controller 6 determines whether an input instruction to select one of the imaging modes is received. The procedure goes to step S4 if the controller 6 determines that the input instruction to select one of the imaging modes is received (Yes in step S3), or returns to step S3 if the controller 6 determines that no input instruction to select one of the imaging modes is received (No in step S3).

In step S4, the controller 6 determines whether the input instruction received is an input instruction to select any of the imaging mode C, which is one of the two dimensional imaging modes, and the imaging modes F and G, which are two of the CT imaging modes. The procedure goes to step S5 if the controller 6 determines that the input instruction received is an input instruction to select any of the imaging modes C, F and G (Yes in step S4), or ends if the controller 6 determines that no input instruction to select any of the imaging modes C, F and G is received (No in step S4).

In step S5, the controller 6 discriminatively displays the image coverage area 30 in accordance with the selected imaging mode in the preview image 28. After that, the procedure ends.

Effect of the Invention

In this embodiment, the following advantages are obtained.

In this embodiment, as discussed above, an X-ray phase imaging apparatus 100 includes an X-ray source 1; a detector 4 configured to detect X-rays radiated from the X-ray source 1; a plurality of gratings arranged between the X-ray source 1 and the detector 4; a rotation mechanism 7 or 11a configured to rotate the plurality of gratings and a subject 90 relative to each other in a plane orthogonal to an optical axis direction of the X-rays; an image processor 5 configured to generate a phase contrast image 20 based on a detection signal generated by the X-ray source 1 and the detector 4, and to generate a preview image 28 based on detection signal generated by the X-ray source 1 and the detector 4 prior to capture of the phase contrast image 20; and a controller 6 configured to control function of displaying on a display 12 the preview image 28 generated by the image processor 5, and function of discriminatively displaying on the display 12 an image coverage area for the phase contrast image 20 that is associated with a relative rotation angle between the plurality of gratings and the subject 90. The controller 6 is configured to control function of discriminatively displaying an image coverage area 30 for the phase contrast image 20, which is associated with a relative rotation angle between the plurality of gratings and the subject 90, in the preview image 28 on the display 12. Accordingly, the image coverage area 30, which is associated with a relative rotation angle, is discriminatively displayed in a preview image 28 so that users can immediately recognize the image coverage area 30 of the subject 90 before the phase contrast image 20 is captured. Consequently, in a case in which the phase contrast image 20 is captured while the plurality of gratings and the subject 90 are rotated relative to each other, it is possible to prevent exclusion of the subject 90 to be rotated relative to the gratings from the image coverage area 30.

In this embodiment, as discussed above, a display method of a preview image 28 in an X-ray phase imaging apparatus 100 is a display method of the preview image 28 in the X-ray phase imaging apparatus 100 including an X-ray source 1, a detector 4 and a plurality of gratings, the method including a step of generating a preview image 28 based on a detection signal generated by the X-ray source 1 and the detector 4 prior to capture of a phase contrast image 20; a step of displaying the preview image 28 on a display 12; and a step of discriminatively displaying on the display 12 in the preview image 28 an image coverage area for the phase contrast image 20 that is associated with a relative rotation angle between the plurality of gratings and a subject 90. Accordingly, the image coverage area 30, which is associated with a relative rotation angle, is discriminatively displayed in a preview image 28 so that users can immediately recognize the image coverage area 30 of the subject 90 before the phase contrast image 20 is captured. Consequently, in a case in which the phase contrast image 20 is captured while the plurality of gratings and the subject 90 are rotated relative to each other, it is possible to prevent exclusion of the subject 90 to be rotated relative to the gratings from the image coverage area 30.

In addition, the following additional advantages can be obtained by the aforementioned embodiment added with configurations discussed below.

In this embodiment, as discussed above, the controller 6 is configured to control function of superimposing on the preview image 28 a mark 32 representing an image coverage area 30 for the phase contrast images 20 that is associated with the relative rotation angles between the plurality of gratings and the subject 90 as the function of discriminatively displaying the image coverage area 30. The image coverage area 30 can be suitably displayed in the preview image 28 by superimposing on the preview image 28 the mark 32 representing the image coverage area 30 for the phase contrast images 20, which is associated with the relative rotation angles between the plurality of gratings and the subject 90, so that users can easily recognize the image coverage area 30.

In this embodiment, as discussed above, the X-ray phase imaging apparatus further includes a plurality of grating supporters 70 supporting the plurality of gratings and configured to rotate together with the plurality of gratings relative to the subject, wherein the controller 6 is configured to specify a predetermined area as the image coverage area 30 based on a position that corresponds to each grating supporter 70, which will rotate relative to the subject, and will be seen in the preview image 28. Accordingly, the image coverage area 30 can be specified based on a position that corresponds to each grating supporter 70 and will be seen in the preview image 28, and as a result the image coverage area 30 in preview image 28 can be easily displayed.

In this embodiment, as discussed above, the controller 6 is configured to specify as the image coverage area 30 an overlap area that is included in a plurality of image coverage areas 30 corresponding to a plurality of relative rotation angles as the relative rotation angle in a case in which the plurality of phase contrast images as the phase contrast image 20 are captured at the plurality of relative rotation angles while the plurality of gratings and the subject 90 are rotated relative to each other by the rotation mechanism 11a. Accordingly, in the case in which a plurality of phase contrast images 20 are captured at the relative rotation angles while the plurality of gratings and the subject 90 are rotated relative to each other, an image coverage area 30 that corresponds to the plurality of phase contrast images 20 can be suitably displayed as the image coverage area 30 in the preview image 28.

In this embodiment, as discussed above, the controller 6 is configured to control the function of discriminatively displaying an image coverage area 30 in the preview image 28 in a case in which the phase contrast images 20 will be captured at relative rotation angles at least zero, 45, 90 and 135 degrees. Accordingly, in the case in which phase contrast images 20 are captured at relative rotation angles at least zero, 45, 90 and 135 degrees, an image coverage area 30 that corresponds to the four types of phase contrast images 20 can be surely displayed as the image coverage area 30 in the preview image 28.

In this embodiment, as discussed above, the X-ray phase imaging apparatus further includes a storage 13 configured to store a plurality of imaging modes and a plurality of different image coverage areas 30 corresponding to the plurality of imaging modes as the image coverage area, wherein the controller 6 is configured to control the function of discriminatively displaying an image coverage area 30 in accordance with the imaging mode that has been selected. Accordingly, even in a case in which depending on a plurality of phase contrast images their corresponding image coverage areas 30 can be different from each other, a suitable coverage area 30 can be suitably displayed in the preview image 28.

In this embodiment, as discussed above, the plurality of imaging modes includes a first imaging mode C that generates a plurality of phase contrast images as the phase contrast image 20 captured while the subject 90 is rotated relative to the X-ray source 1 and the detector 4, and second imaging modes F and G that generate a plurality of phase contrast images as the phase contrast image 20 captured while the subject holder 10 is rotated relative to the X-ray source 1 and the detector 4 and generate a CT image 24 based on the plurality of phase contrast images 20 generated; and the image coverage area 30 in the first imaging mode C has an octagonal shape, respectively, and the image coverage area 30 in the second imaging modes F and G have a circular shape. Accordingly, users can easily recognize the octagonal or circular image coverage area 30 in the preview image 28.

In this embodiment, as discussed above, the controller 6 is configured to control function of displaying a line 31 representing the image coverage area 30 as the function of discriminatively displaying the image coverage area 30. Accordingly, users can more easily recognize the image coverage area 30 that is displayed by the line 31 in the preview image 28.

In this embodiment, as discussed above, the phase contrast image 20 is a dark-field image 23. Accordingly, in a case in which the dark-field image 23 is captured while the plurality of gratings and the subject 90 are rotated relative to each other, it is possible to suitably prevent exclusion of the subject 90 to be rotated relative to the gratings from the image coverage area 30.

Modified Embodiments

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

Figure 15:
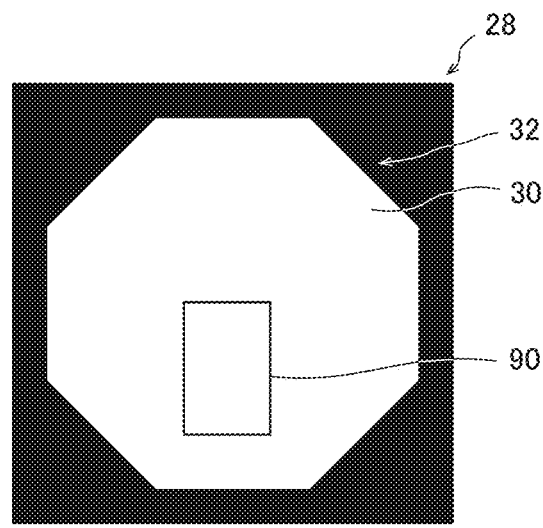
FIG. 15 is a schematic diagram showing an exemplary preview image with its image coverage area according to a modified embodiment 1 being displayed.

While the example in which function of displaying the line 31 representing an image coverage area 30 is used as the function of superimposing on the preview image 28 a mark 32 representing an image coverage area 30 for phase contrast images 20 that is associated with the relative rotation angles between the plurality of gratings and the subject 90 has been shown in the aforementioned embodiment, the present invention is not limited to this. In the present invention, as the function of superimposing on the preview image 28 a mark 32 representing an image coverage area 30 for a phase contrast image 20 that is associated with the relative rotation angles between the plurality of gratings and the subject 90, the image coverage area 30 for a phase contrast image 20 may be displayed in the preview image 28 by an image coverage area 30 for phase contrast images 20 that is associated with a plurality of relative rotation angles and is shaded with a solid black area displaying an area outside the image coverage area superimposed on the preview image 28 as shown in FIG. 15 of a modified embodiment 1.

While the example in which the function of superimposing on the preview image 28 a mark 32 representing an image coverage area 30 for phase contrast images 20 that is associated with the relative rotation angles between the plurality of gratings and the subject 90 is used has been shown in the aforementioned embodiment, the present invention is not limited to this. In the present invention, an area outside an image coverage area may be cut out from the preview image 28.

Figure 16:
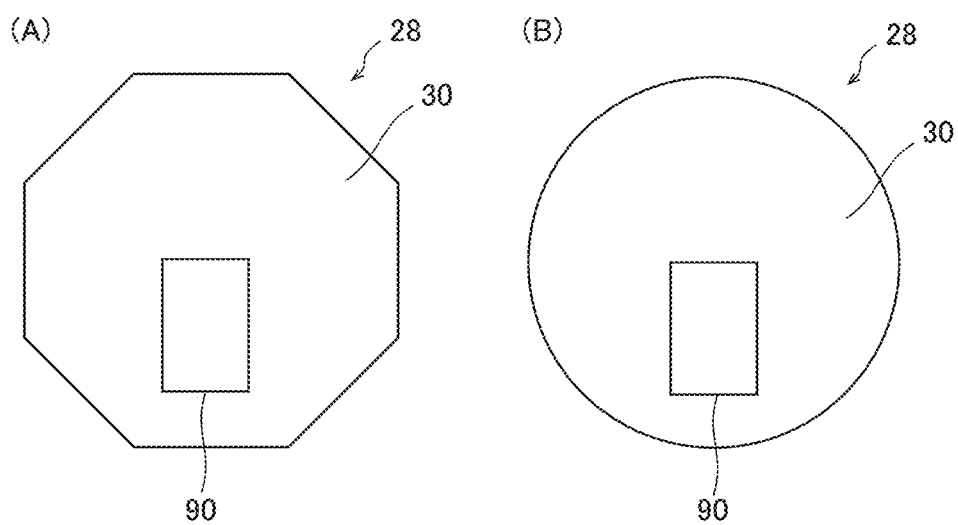
FIG. 16 is a schematic diagram showing exemplary preview images with their image coverage area according to a modified embodiment 2 being displayed.

That is, in the imaging mode C in which an octagonal image coverage area 30 is shown in a preview image 28, a preview image 28 that is obtained by cut out the area outside the octagonal area, which displays the image coverage area 30, may be displayed on the display 12 as shown in FIG. 16(A) of a modified embodiment 2. Also, in the imaging modes F and G in which a circular image coverage area 30 is shown in a preview image 28, a preview image 28 that is obtained by cut out the area outside the circular area, which displays the image coverage area 30, may be displayed on the display 12 as shown in FIG. 16(B). These examples can also suitably display a coverage area 30 in the preview image 28.

While the example in which the controller 6 is configured to control function of displaying a line 31 representing the image coverage area 30 as the function of discriminatively displaying an image coverage area 30 has been shown in the aforementioned embodiment, the present invention is not limited to this. In the present invention, function of displaying an image coverage area 30 in the preview image 28 is not specifically limited as long as the image coverage area 30 can be discriminatively displayed in the preview image 28 on the display 12.

While the example in which the controller 6 is configured to specify a predetermined area as an image coverage area 30 based on a position that corresponds to each grating supporter 70 and will be seen in the preview image 28 has been shown in the aforementioned embodiment, the present invention is not limited to this. In the present invention, the controller 6 may be configured to specify the image coverage area 30 in accordance with predetermined coordinate values.

While the example in which images of the subject 90 are captured at relative rotation angles between the subject 90 and the plurality of gratings of zero, 45, 90 and 135 degrees in the imaging mode C, of zero, 45, 90 and 135 degrees in the imaging mode F, and of zero, 22.5, 45, 67.5, 90, 112.5, 135 and 157.5 degrees in the imaging mode G has been shown in the aforementioned embodiment, the present invention is not limited to this. The number of the different relative rotation angles in the imaging modes C, F and G can be not smaller than three, and the relative rotation angles are not limited to the aforementioned angles.

While the example in which the controller 6 is configured to control the function of discriminatively displaying the image coverage area 30 in the preview image 28 in a case in which any of the imaging modes C, F and G is selected has been shown in the aforementioned embodiment, the present invention is not limited to this. In the present invention, the controller 6 may be configured to control the function of discriminatively displaying an image coverage area 30 in the preview image 28 in a case in which any imaging mode is selected.

While the example in which the image coverage area 30 in the imaging mode C has an octagonal shape has been shown in the aforementioned embodiment, the present invention is not limited to this. In the present invention, the image coverage area may have a polygonal shape the number of whose sides depends on the number of relative rotation angles in the imaging mode C or a circular shape. While the example in which the image coverage area 30 in the imaging modes F and G has a circular shape has been shown in the aforementioned embodiment, the present invention is not limited to this. In the present invention, the image coverage area may have a polygonal shape the number of whose sides depends on the number of relative rotation angles in the imaging modes F and G.

Also, while the example in which the plurality of gratings includes the first and second gratings 2 and 3 has been shown in the aforementioned embodiment, the present invention is not limited to this. In the present invention, the plurality of gratings may further include a third grating arranged between the X-ray source 1 and the first grating 2. In this case, the third grating can increase coherence of X-rays radiated from the X-ray source 1.

Also, while the example in which the grating-moving mechanism 8 is configured to translate the first grating 2 has been shown in the aforementioned embodiment, the present invention is not limited to this. In the present invention, any of the gratings may be translated.

Also, while the example in which the image processor 5 is configured to generate at least the dark-field image 23 has been shown in the aforementioned embodiment, the present invention is not limited to this. In the present invention, the image processor 5 may be configured to generate the absorption image 21 and/or the differential phase image 22 without generating the dark-field image 23.

Also, while the example in which the image processor 5 is configured to generate at least the CT image 27 of the dark-field images has been shown in the aforementioned embodiment, the present invention is not limited to this. In the present invention, the image processor 5 may be configured to generate the CT image 25 of the absorption images and/or the CT image 26 of the differential phase images without generating the CT image 27 of the dark-field images.

MODES

The aforementioned exemplary embodiment will be understood as concrete examples of the following modes by those skilled in the art.

Mode Item 1

An X-ray phase imaging apparatus includes an X-ray source; a detector configured to detect X-rays radiated from the X-ray source; a plurality of gratings arranged between the X-ray source and the detector; a rotation mechanism configured to rotate the plurality of gratings and a subject relative to each other in a plane orthogonal to an optical axis direction of the X-rays; an image processor configured to generate a phase contrast image based on a detection signal generated by the X-ray source and the detector, and to generate a preview image based on the detection signal generated by the X-ray source and the detector prior to capture of the phase contrast image; and a controller configured to control function of displaying on a display the preview image generated by the image processor, and function of discriminatively displaying on the display an image coverage area for the phase contrast image that is associated with a relative rotation angle between the plurality of gratings and the subject.

Mode Item 2

The X-ray phase imaging apparatus according to the mode item 1, wherein the controller is configured to control function of superimposing a mark representing the image coverage area for the phase contrast image, which is associated with a relative rotation angle between the plurality of gratings and the subject, on the preview image, or function of removing an area outside the image coverage area from the preview image as the function of discriminatively displaying an image coverage area.

Mode Item 3

The X-ray phase imaging apparatus according to the mode item 1 further includes a plurality of grating supporters supporting the plurality of gratings and configured to rotate together with the plurality of gratings relative to the subject, wherein the controller is configured to specify a predetermined area as the image coverage area based on a position that corresponds to each grating supporter which will rotate relative to the subject, and will be seen in the preview image.

Mode Item 4

The X-ray phase imaging apparatus according to the mode item 1, wherein the controller is configured to specify as the image coverage area an overlap area that is included in a plurality of image coverage areas corresponding to a plurality of relative rotation angles as the relative rotation angle in a case in which the plurality of phase contrast images as the phase contrast image are captured at the plurality of relative rotation angles while the plurality of gratings and the subject are rotated relative to each other by the rotation mechanism.

Mode Item 5

The X-ray phase imaging apparatus according to the mode item 1, wherein the controller is configured to control the function of discriminatively displaying an image coverage area in the preview image in a case in which the phase contrast images will be captured at relative rotation angles at least zero, 45, 90 and 135 degrees.

Mode Item 6

The X-ray phase imaging apparatus according to the mode item 1 further includes a storage configured to store a plurality of imaging modes and a plurality of different image coverage areas corresponding to the plurality of imaging modes as the image coverage area, wherein the controller is configured to control the function of discriminatively displaying an image coverage area in accordance with the imaging mode that has been selected.

Mode Item 7

The X-ray phase imaging apparatus according to the mode item 6, wherein the plurality of imaging modes includes a first imaging mode that generates a plurality of phase contrast images as the phase contrast image captured while the subject is rotated relative to the X-ray source and the detector, and a second imaging mode that generates a plurality of phase contrast images as the phase contrast image captured while the subject is rotated relative to the X-ray source and the detector and generates a CT image based on the plurality of phase contrast images generated; and the image coverage areas of the first and second imaging modes have octagonal and circular shapes, respectively.

Mode Item 8

The X-ray phase imaging apparatus according to any of the mode items 1 to 7, wherein the controller is configured to control function of displaying a line representing the image coverage area as the function of discriminatively displaying an image coverage area.

Mode Item 9

The X-ray phase imaging apparatus according to any of the mode items 1 to 7, wherein the phase contrast image is a dark-field image.

Mode Item 10

A display method of a preview image in an X-ray phase imaging apparatus, which includes an X-ray source, a detector and a plurality of gratings, includes a step of generating a preview image based on a detection signal generated by the X-ray source and the detector prior to capture of a phase contrast image; a step of displaying the preview image on a display; and a step of discriminatively displaying on the display in the preview image an image coverage area for the phase contrast image that is associated with a relative rotation angle between the plurality of gratings and a subject.

The invention claimed is:

1. An X-ray phase imaging apparatus comprising:
   an X-ray source;
   a detector configured to detect X-rays radiated from the X-ray source;
   a plurality of gratings arranged between the X-ray source and the detector;
   a rotation mechanism configured to rotate the plurality of gratings and a subject relative to each other in a plane orthogonal to an optical axis direction of the X-rays;
   an image processor configured to generate a phase contrast image based on a detection signal generated by the X-ray source and the detector, and to generate a preview image based on the detection signal generated by the X-ray source and the detector prior to capture of the phase contrast image; and
   a controller configured to control function of displaying on a display the preview image generated by the image processor, and function of discriminatively displaying on the display an image coverage area for the phase contrast image that is associated with a relative rotation angle between the plurality of gratings and the subject.

2. The X-ray phase imaging apparatus according to claim 1, wherein the controller is configured to control function of superimposing a mark representing the image coverage area for the phase contrast image, which is associated with a relative rotation angle between the plurality of gratings and the subject, on the preview image, or function of removing an area outside the image coverage area from the preview image as the function of discriminatively displaying an image coverage area.

3. The X-ray phase imaging apparatus according to claim 1 further comprising a plurality of grating supporters supporting the plurality of gratings and configured to rotate together with the plurality of gratings relative to the subject, wherein
   the controller is configured to specify a predetermined area as the image coverage area based on a position that corresponds to each grating supporter which will rotate relative to the subject, and will be seen in the preview image.

4. The X-ray phase imaging apparatus according to claim 1, wherein the controller is configured to specify as the image coverage area an overlap area that is included in a plurality of image coverage areas corresponding to a plurality of relative rotation angles as the relative rotation angle in a case in which a plurality of phase contrast images as the phase contrast image are captured at the relative rotation angles while the plurality of gratings and the subject are rotated relative to each other by the rotation mechanism.

5. The X-ray phase imaging apparatus according to claim 1, wherein the controller is configured to control the function of discriminatively displaying an image coverage area in the preview image in a case in which the phase contrast images will be captured at relative rotation angles at least zero, 45, 90 and 135 degrees.

6. The X-ray phase imaging apparatus according to claim 1, further comprising a storage configured to store a plurality of imaging modes and a plurality of different image coverage areas corresponding to the plurality of imaging modes as the image coverage area, wherein
   the controller is configured to control the function of discriminatively displaying an image coverage area in accordance with the imaging mode that has been selected.

7. The X-ray phase imaging apparatus according to claim 6, wherein
   the plurality of imaging modes includes a first imaging mode that generates a plurality of phase contrast images as the phase contrast image captured while the subject is rotated relative to the X-ray source and the detector, and a second imaging mode that generates a plurality of phase contrast images as the phase contrast image captured while the subject is rotated relative to the X-ray source and the detector and generates a CT image based on the plurality of phase contrast images generated; and
   the image coverage areas of the first and second imaging modes have octagonal and circular shapes, respectively.

8. The X-ray phase imaging apparatus according to claim 1, wherein the controller is configured to control function of displaying a line representing the image coverage area as the function of discriminatively displaying an image coverage area.

9. The X-ray phase imaging apparatus according to claim 1, wherein the phase contrast image is a dark-field image.

10. A display method of a preview image in an X-ray phase imaging apparatus including an X-ray source, a detector and a plurality of gratings, the method comprising:
    a step of generating a preview image based on a detection signal generated by the X-ray source and the detector prior to capture of a phase contrast image;
    a step of displaying the preview image on a display; and
    a step of discriminatively displaying on the display in the preview image an image coverage area for the phase contrast image that is associated with a relative rotation angle between the plurality of gratings and a subject.

* * * * *